United States Patent
Porte et al.

(10) Patent No.: US 8,398,016 B2
(45) Date of Patent: Mar. 19, 2013

(54) AIR INTAKE ARRANGEMENT FOR AN AIRCRAFT

(75) Inventors: Alain Porte, Colomiers (FR); Emeric Chancerelle, Toulouse (FR); Franck Alvarez, Toulouse (FR); Damien Prat, Colomiers (FR)

(73) Assignee: Airbus Operations (SAS), Toulouse Cedex (FR)

( * ) Notice: Subject to any disclaimer, the term of this patent is extended or adjusted under 35 U.S.C. 154(b) by 82 days.

(21) Appl. No.: 13/122,885

(22) PCT Filed: Oct. 5, 2009

(86) PCT No.: PCT/FR2009/001179
§ 371 (c)(1),
(2), (4) Date: Jun. 23, 2011

(87) PCT Pub. No.: WO2010/040911
PCT Pub. Date: Apr. 15, 2010

(65) Prior Publication Data
US 2011/0253843 A1    Oct. 20, 2011

Related U.S. Application Data

(63) Continuation of application No. PCT/FR2009/001179, filed on Oct. 5, 2009.

(30) Foreign Application Priority Data

Oct. 7, 2008    (FR) ..................................... 08 05525

(51) Int. Cl.
*F02C 7/04* (2006.01)
(52) U.S. Cl. ..................................... 244/53 B; 137/15.1

(58) Field of Classification Search ................. 244/53 B, 244/129.4; 137/15.1; 60/785
See application file for complete search history.

(56) References Cited

U.S. PATENT DOCUMENTS

| 4,174,083 A | 11/1979 | Mohn |
| 5,167,249 A * | 12/1992 | Karanian ..................... 137/15.1 |
| 6,082,669 A * | 7/2000 | Bardagi et al. .............. 244/53 B |
| 2006/0060697 A1* | 3/2006 | Beaufort ..................... 244/53 B |

FOREIGN PATENT DOCUMENTS

| FR | 2879563 | 6/2006 |
| FR | 2879564 | 6/2006 |
| FR | 2915461 | 10/2008 |
| WO | 2006067296 | 6/2006 |
| WO | 2006067299 | 6/2006 |

OTHER PUBLICATIONS

European Patent Office, International Search Report PCT/FR2009/001179, Feb. 2, 2010 (English, 3 pgs) (French, 3 pgs), Form PCT/ISA/237 (5 pgs.) (English language translation 6 pgs).

* cited by examiner

*Primary Examiner* — Rob Swiatek
(74) *Attorney, Agent, or Firm* — Wood, Herron & Evans, LLP

(57) ABSTRACT

An air intake arrangement includes a mobile plate controlled by at least one fluid communication passage or opening extending between the outer and inner surfaces of the mobile plate. The fluid communication passage or opening is located at least in the vicinity of a limited downstream area of the outer surface, is at a high pressure when the aircraft flies at cruising speed, and is capable of transmitting the high pressure to an extended area of the inner surface. The air flowing through the air intake arrangement may be used to refresh an enclosed area with electrical or mechanical equipment.

10 Claims, 4 Drawing Sheets

AIR INTAKE ARRANGEMENT FOR AN AIRCRAFT

This application claims priority, under Section 371 and/or as a continuation under Section 120, to PCT Application No. PCT/FR2009/001179, filed on Oct. 5, 2009, which claims priority to French Application No. 0805525, filed on Oct. 7, 2008.

TECHNICAL FIELD

The present invention relates to an air intake arrangement for an aircraft comprising an air passage channel with an air intake hole.

BACKGROUND

It is known that such air intake arrangements are widely used in the aeronautic field with air refreshing purposes in an enclosed area containing heat sensitive materials and/or dangerous surroundings, of the flammable or explosive type, for which it is required to provide a continuous ventilation of the area so as to avoid any risk of malfunction of the materials or of surrounding incident.

This is more specifically the case of numerous mechanical and/or electrical devices provided in the annular enclosed area between the pod and the external case of the blower and compressors of an aircraft turbojet. Such devices, such as for example, the fadec (full authority digital control), the accessory gearbox, the engine oil tank, the fluid components, etc. generally fastened around the external case and thus located in the enclosed area, are ventilated by external air coming into the arrangement through the air intake hole for crossing the channel arranged in the pod and spreading, at the channel outlet, in the enclosed area. The devices, as well as the oil vapours or similar spreading out of this area, are ventilated with the external fresh air spread through the air channel, helping to ensure the good operation thereof.

In order to comply with the regulation in force, prescribing the air to be appropriately refreshed by time unit in the relevant enclosed area, the air passage channel of the arrangement has a predetermined cross-section allowing a sufficient amount of air to be circulated in the channel so as to provide, at the outlet thereof, the air refreshment in the enclosed area containing the devices to be ventilated.

However, as the amount of external air coming into the predetermined cross-section air channel is more specifically a function of parameters related to the speed of the aircraft and to the altitude thereof, it is difficult to optimally ventilate the devices to be cooled down and the vapours to be discharged.

Indeed, while the external air coming upstream through the air intake hole in the predetermined cross-section channel of the arrangement and coming out downstream the latter is sufficient for correctly ventilating the devices when the aircraft is in a ground taxiing phase or in a takeoff phase or even in a waiting phase, thus at a low speed and altitude, in contrast, when the aircraft is in a cruising flight phase at maximum speed and altitude, the air flow rate coming out of the channel of the arrangement towards the area to be ventilated is too significant. Measurements enabled to observe that, in such a flight phase, the air circulating in the enclosed area through the channel of the arrangement was refreshed twice as much as necessary. Furthermore, the air coming into the enclosed area generates drags, resulting in a speed loss for the aircraft, and thus in an increase of the fuel consumption for said engine.

In order to overcome such drawbacks, documents WO-2006/067296 and WO-2006/067299 describe air intake arrangements comprising plugging means with controllable mobile member, being associated with said air passage channel, and means for controlling said mobile member, operated either voluntarily by the pilot of said aircraft, or, advantageously, in an automatic way. In this latter case, said controlling means comprise a variable volume tank cylinder/piston, bladder, bellows, etc. assembly receiving the total pressure exerted on said aircraft by the air and being connected to said controllable mobile member. However, as the pressure is not locally stable, such a system cannot be optimum. In addition, such controlling means are heavy with respect to their environment and they tend to generate vibration or unbalance phenomena requiring some reinforcement of the assembly, which makes said air intake arrangement considerably heavier. Now, in order to restrict the fuel consumption of aircraft, the designers aim at creating lighter systems.

Thus, in order to overcome such drawbacks, document FR 07/02956 discloses an air intake arrangement comprising plugging means with controllable resilient blade, associated with said air passage channel, and means for controlling the resilient blade formed by an aerodynamic profile arranged transversally with respect to said air passage channel and fastened to an end of said resilient blade and able to generate a bearing strength under the action of the external air flow crossing the channel. However, micro-cracks are able to appear on the profile structure, including at the level of its fastening with the resilient blade, essentially as a result of the high speed of the air flow and of the high pressure applied on the profile, which may result in the life duration and the efficiency of said arrangement becoming considerably reduced.

The object of the present invention is to overcome such drawbacks and it relates to an air intake arrangement with a design allowing to provide an optimum ventilation of an enclosed area such as previously described regarding a turbojet, but that could also be a light area or a belly fairing of the aircraft or, generally, any more or less closed and heat sensitive area of an aircraft for which an air refreshment is desired.

SUMMARY OF THE INVENTION

To this end, according to this invention, the air intake arrangement for an aircraft comprising at least one air passage channel provided with an air intake hole taking an external air flow, plugging means with controllable mobile plate associated with said channel and means for controlling said controllable mobile plate allowing to vary the cross-section of said channel between a minimum cross-section enabling a minimum air flow rate toward an area to be ventilated in said aircraft and a maximum cross-section enabling a maximum air flow rate toward said area, said plate comprising an external side subjected to said air flow and an internal side directed toward said channel, the upstream end of said plate being connected to said channel, in the vicinity of the upstream edge of said air intake hole, and the downstream end of said plate being free to move through the cross-section of said channel, is remarkable in that:
- when said aircraft is on a cruising flight, the downstream edge of said air intake hole is able to generate a high pressure on a limited downstream area of said external side; and
- said controlling means comprise fluid communication means between said external and internal sides of the mobile plate, located at least in the vicinity of said limited downstream area of said external side and able to communicate said high pressure to an extended area of said internal side.

Indeed, the Applicant discovered that it was possible to proceed in such a way that on the external side of said plate, during a cruising flight phase of the aircraft (i.e. at high speed and altitude), there should be a limited downstream area of high pressure in the vicinity of the downstream edge (i.e. of the leading edge) of the air intake hole and an upstream area with a lower pressure in the vicinity of the upstream edge of said hole. In contrast, should the aircraft be in a takeoff phase, a waiting phase or a taxiing phase (thus, at low speed and altitude), the pressure in the limited downstream area strongly decreases, whereas that in the upstream area substantially increases.

Thus, thanks to this invention, during a cruising flight phase of the aircraft, the fluid communication means enable an at least partial adjustment of the pressure in the extended area of the internal side of the plate to that of the limited downstream area with high pressure, resulting in the plate being moved and the cross-section of said channel being partially plugged. On the contrary, during a takeoff, waiting or ground taxiing phase, the low pressure at the level of the limited downstream area (and thus of the extended area) does not allow said plate to be moved. Moreover, particularly during a takeoff phase, the then high pressure of the upstream area on the external side of the mobile plate could help to maintain said plate in such a position that the opening of the cross-section of said channel remains at a maximum.

Thereby, automatic plugging means are obtained as a function of pressure at the level of the air intake hole (and therefore of the speed and the altitude of the aircraft), able to vary the cross-section of said channel by said plugging means and to modify, depending on the flight phases of the aircraft, the air flow rate coming in the enclosed area and, consequently, to ventilate at the best the relevant devices.

For example, upon a cruising flight of an aircraft (high speed and altitude), the cross-section of said channel is advantageously and automatically decreased so as to reasonably ventilate the devices and limit the drag on the whole pod by the air absorbed in the enclosed area. In contrast, when the aircraft is taxiing on the ground, or in a takeoff phase (low speed and altitude), the cross-section of the channel is automatically opened at the maximum through removing the mobile plate of said plugging means, for thereby circulating a maximum amount of air in the channel and appropriately ventilating the devices located in the enclosed area.

Thus, in addition, according to this invention, the amount of air taken by the air intake arrangement is adapted for each flight phase, minimizing the penalty of the aircraft performance due to ventilation.

Furthermore, said fluid communication means preferably comprise one or more passages between said external side and said internal side of the plate, so as to allow the pressure in the extended area to be partially adjusted to that of the limited downstream area during a cruising flight of the aircraft. Such passages could, for example, be openings, (circular openings, indentations) directly arranged in the mobile plate, indentations arranged in the side walls of the channel, interstices between the side walls of the channel and the side edges of the mobile plate or even a combination thereof.

Furthermore, as said air passage channel is bound by at least one lower wall and one upper wall, a cavity, covered by said mobile plate, could be advantageously arranged in the lower wall of said air passage channel, along said extended area.

Preferably, said air passage channel could comprise at least one low abutment, enabling to mark the position of said plate corresponding to said maximum cross-section, and at least one high abutment, allowing to mark the position of said plate corresponding to said minimum cross-section. Such low and high abutments allow to stabilize and to limit vibrations of the plate in the respectively maximum and minimum opening positions of the cross-section of said channel.

Moreover, said plate could be formed by a resilient blade, for example a bulging one, spontaneously applying on the low abutment of the air passage channel.

In the case where said fluid communication means comprise a plurality of passages arranged in said plate (for example circular openings), such passages could be arranged on at least one line being substantially parallel to said cross-section of said air passage channel. One of such passages could additionally be advantageously plugged by said low abutment of said air passage channel, when said resilient blade spontaneously applies on the latter, so as to stabilize it in the maximum opening position of the cross-section of said channel.

Moreover, said air passage channel could have a rectangular section and the width of said plate could correspond at least approximately to that of said cross-section of said channel.

BRIEF DESCRIPTION OF THE DRAWINGS

The FIGS. of the appended drawing will better explain how this invention could be implemented. On these FIGS., identical numerals refer to identical members.

DETAILED DESCRIPTION

Figure 1:
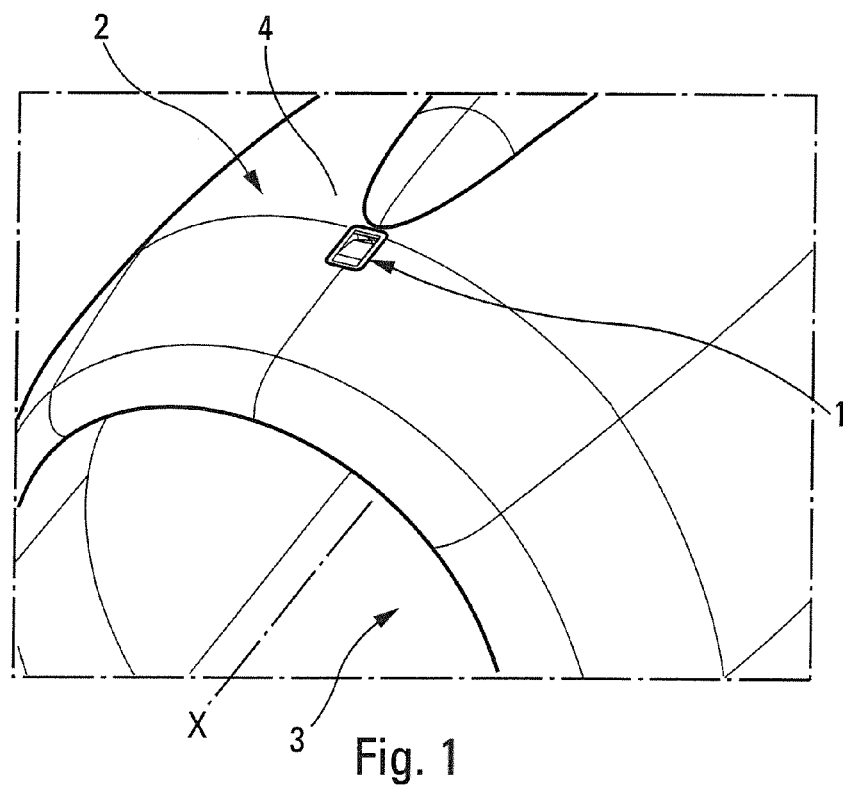
FIG. 1 is a partial schematic view in perspective of a turbojet pod provided with an air intake arrangement according to this invention.
Figure 2:
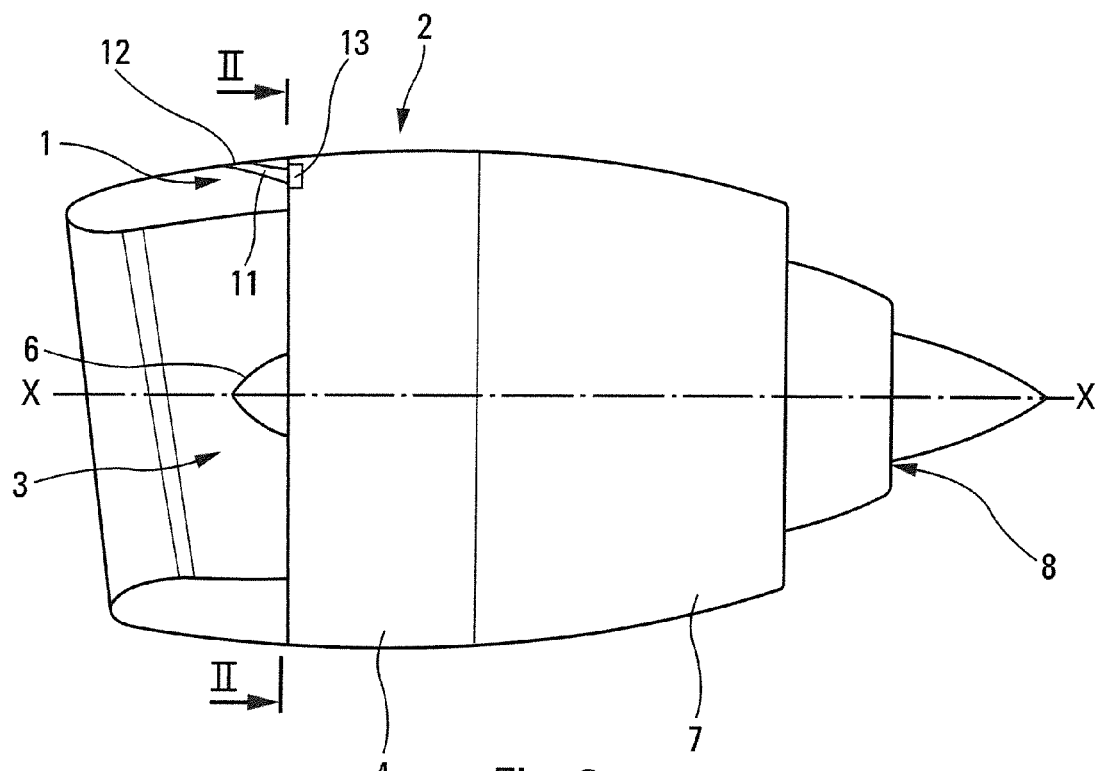
FIG. 2 schematically shows in a partial section the pod of FIG. 1.

The air intake arrangement 1 according to this invention and shown in FIGS. 1 and 2 is provided within the pod 2 of an engine on-board an aircraft.

Figure 3:
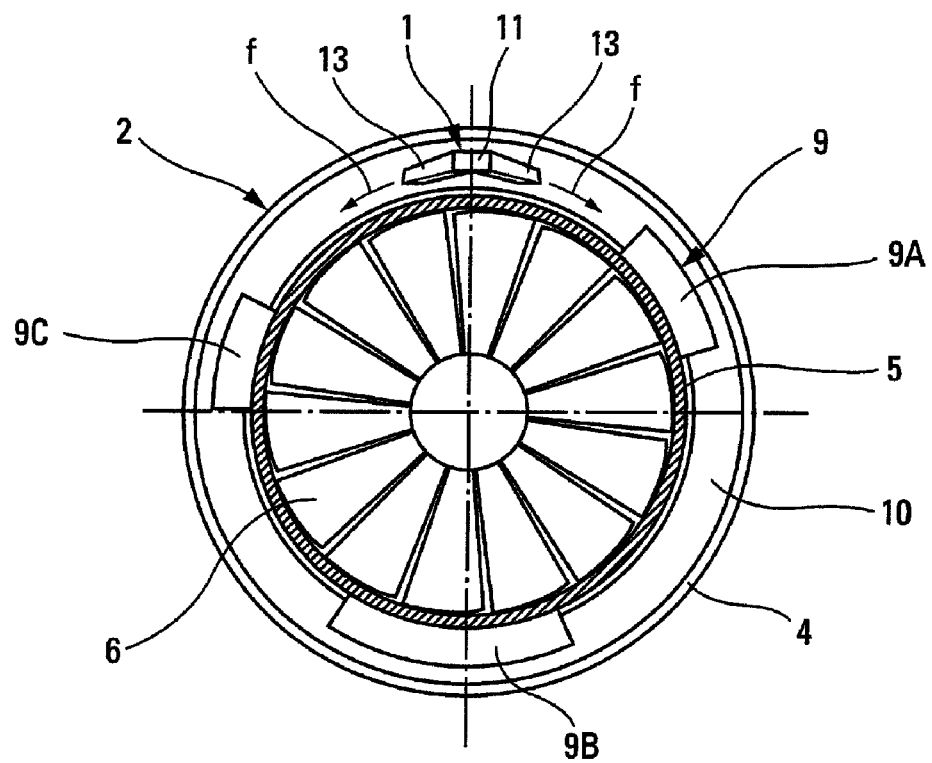
FIG. 3 is a front cross-sectional view along the line II-II of FIG. 2 of said turbojet pod, with different devices to be ventilated.

As schematically shown in FIGS. 1 to 3, the pod usually comprises an air intake front part 3 intended for supplying the engine with air, an intermediary part 4, surrounding the external case 5 of the blower 6 and the compressors of the engine, and a rear part 7, surrounding the combustion chamber and the turbine, from which the external case of the nozzle 8 and the cone thereof emerge.

Different devices or mechanical and/or electrical equipment materials 9 are arranged on the external case 5 of the blower 6 and of the compressors, i.e., in the annular enclosed area 10 between the pod 2 and the external case 5 of the engine. FIG. 3 symbolically shows some of the devices 9 arranged in such an area 10, namely the fadec 9A, the accessory gearbox 9B and the engine oil tank 9C.

Air refreshment in such an enclosed area 10, for maintaining the devices 9 in an appropriate temperature range and allowing a good operation thereof, is provided by the air intake arrangement 1 being located on top of the downstream part of the pod 2 and comprising, to this end, an air passage channel 11 arranged in the structural wall of the front part of the pod 2 and putting in communication the external air with the enclosed area 10. To this end, the channel 11 has upstream an air intake hole 12 and downstream a diffuser 13 in relationship with said area 10, opening into the intermediary part 4 of the pod 2.

The air passage channel 11 is slightly tilted with respect to the external surface of the front part of the pod 2 and is directed downstream toward the longitudinal axis X-X of the engine so as to better take and supply the fresh external air in the channel 11 and then tangentially discharge it through the double outlet diffuser 13, as shown by the arrows f in FIG. 3, on both sides of the annular enclosed area 10.

Figure 4:
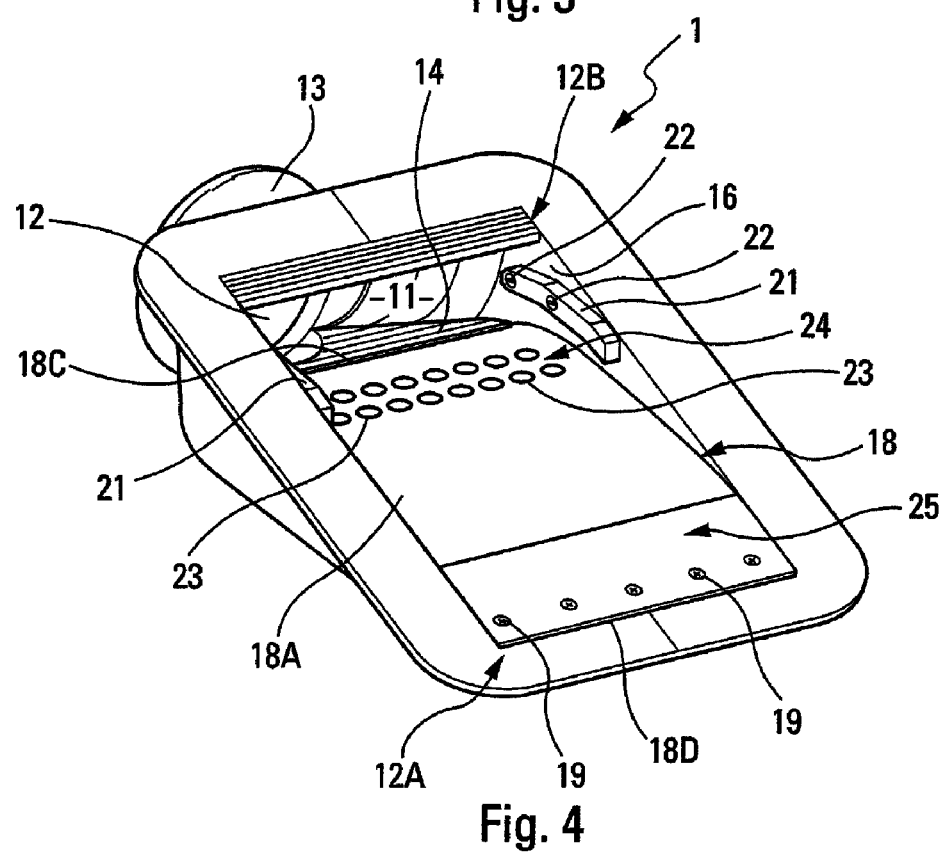
FIG. 4 is a perspective schematic view of an exemplary embodiment of the air intake arrangement of FIG. 1 according to this invention.
Figure 5:
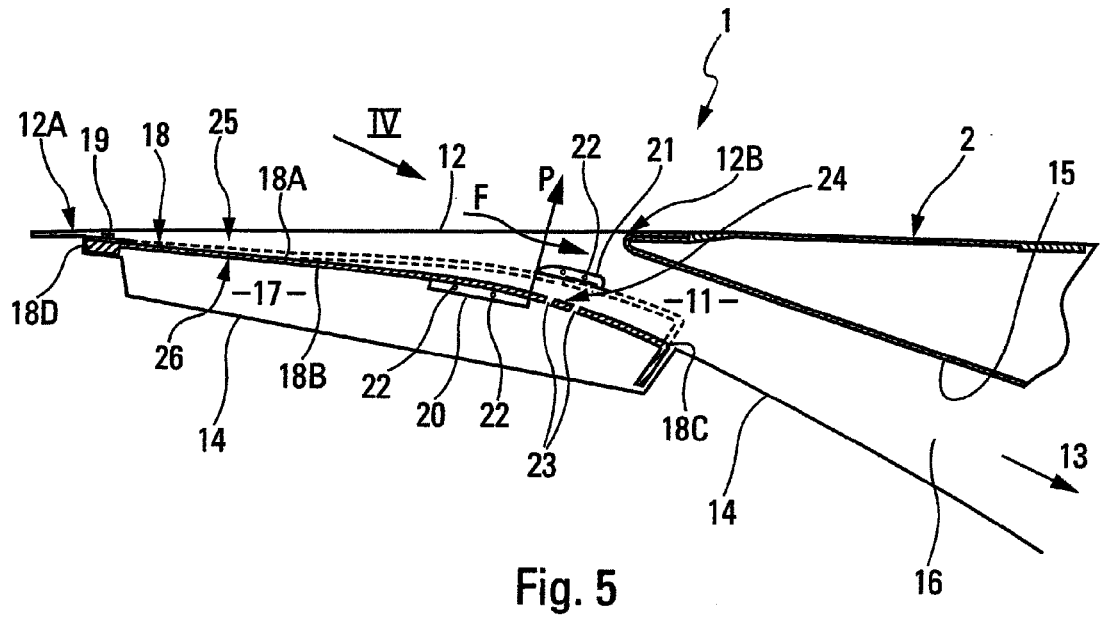
FIG. 5 shows, in a partial longitudinal section, the air intake arrangement of FIG. 4.

In the example shown on FIGS. 4 and 5, the profile of the channel 11 of the arrangement 1 is slightly evolutional, i.e. after having converged downstream its tangential air intake hole 12, it somewhat diverges in the direction of the diffuser 13 and its cross-section is rectangular. The channel 11 is bound by a lower wall 14, an upper wall 15 and two opposite side walls 16.

According to the present invention, the cross-section of the air passage channel 11 is made adjustable thanks to plugging means controlled by the local pressure at the level of the air intake hole 12 and able to regulate the air flow rate circulating in the channel 11, toward the diffuser 13.

In the embodiment as shown in FIGS. 4 and 5, a rectangular cavity 17 is arranged in the lower wall of the channel 11. Such a cavity 17 extends, widthwise, on the width of the channel 11 and, lengthwise, from the upstream edge 12A of the air intake hole 12 up to inside the channel 11 deeply.

The means for plugging the cross-section of the channel 11 comprise a bulging resilient blade 18 with a rectangular shape having a width slightly less than the width of the air passage channel 11. The upstream end 18D of the blade 18 is fastened, for example, by means of a screw 19, to the lower wall 14 of the channel 11, in the vicinity of the upstream edge 12A of the air intake hole 12. In contrast, the downstream end 18C of the blade 18 is free and located inside the air passage channel 11. Moreover, the resilient blade 18 covers the cavity 17.

A low abutment 20 and a high abutment 21 are fastened on each one of the side walls 16 of the cavity 17, for example by means of screws 22, so that the two low abutments 20 face each other, like the high abutments 21.

When the aircraft is in a ground taxiing, a takeoff or a waiting phase (thus, at low altitude and speed), the resilient blade 18 spontaneously applies against each one of the low abutments 20 of the side walls 16.

As shown in FIGS. 4 and 5, passages, as circular openings 23, are arranged in the resilient blade 18. Such circular openings 23 are adjusted on two widths of the blade 18, slightly upstream of the downstream edge 12B of the air intake hole 12, in a limited downstream area 24 on the external side 18A of the blade 18 where the external pressure is high when the aircraft is in a cruising flight phase.

Indeed, when the aircraft bearing the pod 2 moves, an air flow (symbolized by the arrow F on FIG. 5) enters the air passage channel 11 through the air intake hole 12. As a function of the flight phases of the aircraft, two distinct pressure areas are then created, an upstream area 25 and the limited downstream area 24 introduced herein before and located on the external side 18A of the blade 18 in the vicinity of respectively the upstream 12A and the downstream 12B edges of the air intake hole 12, the pressures in the downstream 24 and the upstream 25 areas varying in an antagonistic way depending on the flight phases of the aircraft.

Thus, when the aircraft is in a cruising flight phase, the high pressure in the limited downstream area 24 is communicated, by means of the openings 23, to the cavity 17, generates a pressure force on an extended area 26 of the internal side 18B of the resilient blade 18. The pressure force P tends to move apart the resilient blade 18, against its own resilience, from the low abutments 20 and to bring it closer to the high abutments 21. The resilient blade 18 then acts as a plugger.

Obviously, the deformation of the resilient blade 18 in the direction of the plugging is all the larger as the pressure force P is higher. The maximum plugging of the channel 11 by the resilient blade 18 is fixed by the high abutments 21, being able to cooperate with the external side of the resilient blade 18 so as to stabilize it and limit the vibrations thereof.

Thus, the passage section of the air flow F in the channel 11 can vary, as a function of the pressure at the level of the openings 23, between a maximum value, for which the resilient blade 18 is applied against the low abutments 20, and a minimum value, determined by the high abutments 21.

Figure 6:
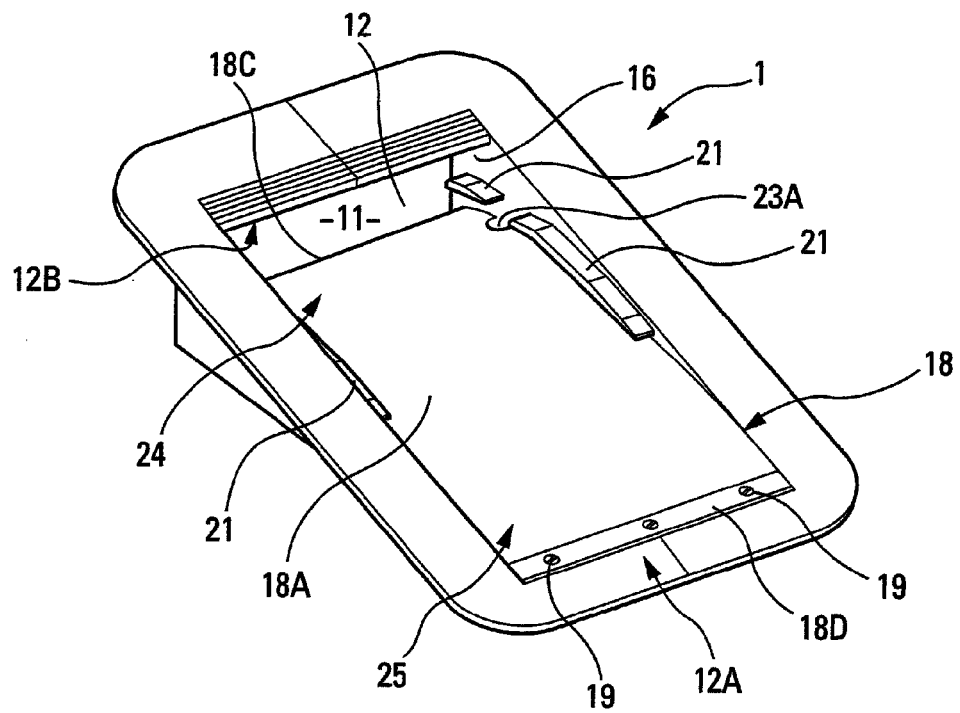
FIGS. 6 and 7 show in a similar view two alternative embodiments of passages of the air intake arrangement in FIG. 5.

In the embodiment shown in FIG. 6, the plurality of circular openings 23 of the resilient blade 18 is replaced by a circular indentation 23A arranged in each one of the two side edges of the resilient blade 18 in the vicinity of said limited downstream area 24.

Moreover, each high abutment 21 of the arrangement 1 (FIGS. 4 and 5) is replaced by two high abutments 21 sufficiently spaced apart one from the other so that the indentation 23A is not plugged when the resilient blade 18 is applied against said high abutments 21.

Figure 7:
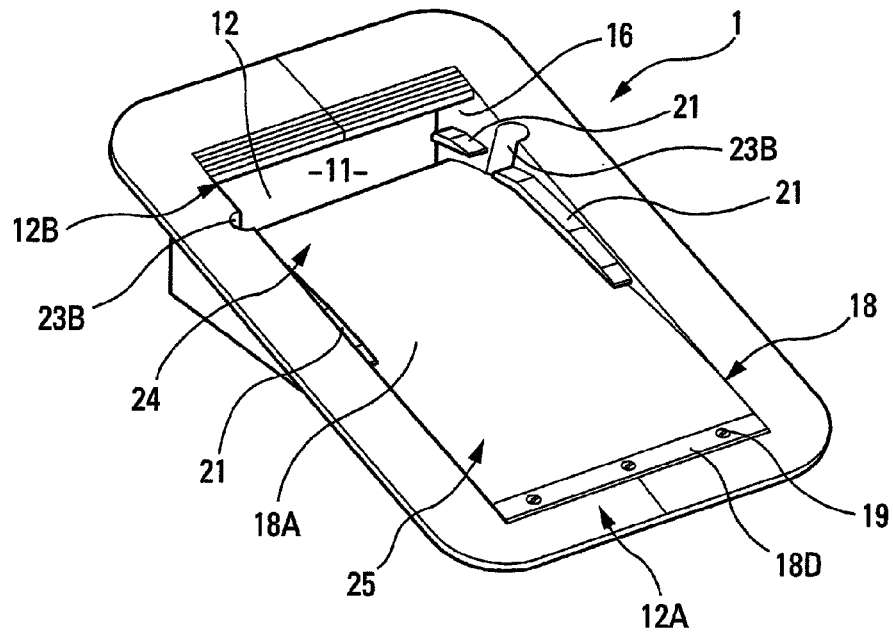

Furthermore, in the alternative embodiment illustrated in FIG. 7, an indentation 23B, forming a passage between the external 18A and the internal 18B sides of said blade 18, is arranged in each one of the side walls 16 of the air passage channel 11, thereby substituting for the circular openings 23.

Figure 8:
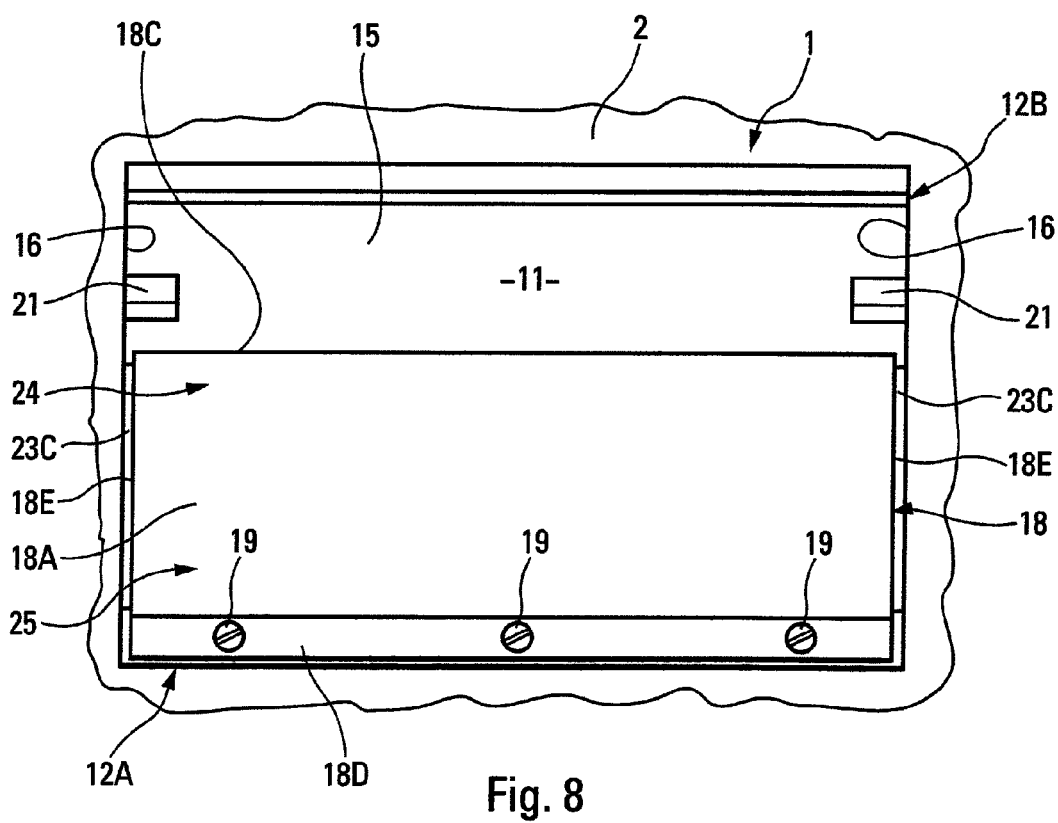
FIG. 8 is a view along the arrow IV of FIG. 5, showing another alternative embodiment of the arrangement according to the present invention.

In the alternative embodiment of FIG. 8, the circular openings 23 of FIG. 5 are replaced by interstices 23C defined between the side walls 16 of the air passage channel 11 and the side edges 18E of said mobile plate 18 opposite the walls 16.

The invention claimed is:
1. An air intake arrangement for an aircraft, comprising:
at least one air passage channel provided with an air intake hole receiving an external air flow,
plugging means with controllable mobile plate associated with the at least one air passage channel, and
means for controlling the controllable mobile plate allowing variation of the cross-section of the at least one air passage channel between a minimum cross-section enabling a minimum air flow rate toward an area to be ventilated of the aircraft and a maximum cross-section enabling a maximum air flow rate toward the area, the plate comprising an external side subjected to the air flow and an internal side directed toward the at least one air passage channel, the upstream end of the plate being connected to the at least one air passage channel, in the vicinity of the upstream edge of the air intake hole, and the downstream end of the plate being free to move through the cross-section of the at least one air passage channel, wherein when the aircraft is in a cruising flight, the downstream edge of the air intake hole is able to generate a high pressure on a limited downstream area of the external side; and wherein the controlling means comprise fluid communication means between the external and internal sides of the mobile plate, located at least in the vicinity of the limited downstream area of the external side and able to communicate the high pressure to an extended area of the internal side.

2. The arrangement according to claim 1, wherein the fluid communication means comprise at least one passage between the external side and the internal side of the plate.

3. The arrangement according to claim 2, wherein each passage comprises an opening arranged in the mobile plate.

4. The arrangement according to claim 2, wherein the at least one air passage channel comprises opposite lower and higher walls and two opposite side walls, and wherein each passage comprises an indentation arranged in one of the side walls of the at least one air passage channel.

5. The arrangement according to claim 2, wherein the at least one air passage channel comprises opposite lower and higher walls and two opposite side walls, and wherein each passage is an interstice formed between one of the side walls of the at least one air passage channel and the opposite side edge of the mobile plate.

6. The arrangement according to claim 1, wherein the at least one air passage channel is bound by at least one lower wall and one higher wall, the walls being opposite, and wherein a cavity, covered by the mobile plate, is arranged in the lower wall of the at least one air passage channel, along the extended area.

7. The arrangement according to claim 1, wherein the at least one air passage channel comprises at least one low abutment functioning to mark the position of the plate corresponding to the maximum cross-section, and at least one high abutment functioning to mark the position of the plate corresponding to the minimum cross-section.

8. The arrangement according to claim 7, wherein the plate is formed by a resilient blade spontaneously applied against the low abutment of the at least one air passage channel.

9. The arrangement according to claim 1, wherein the fluid communication means comprises a plurality of passages arranged in the plate, the passages being arranged on at least one line substantially parallel to the cross-section of the at least one air passage channel.

10. The arrangement according to claim 1, wherein the at least one air passage channel has a rectangular section and the width of the plate corresponds at least approximately to that of the cross-section of the at least one air passage channel.

* * * * *